Jan. 20, 1948.                    H. MOBBS ET AL                    2,434,711
                              SLIDING ROOF FOR VEHICLES
                              Filed June 18, 1945              6 Sheets-Sheet 5
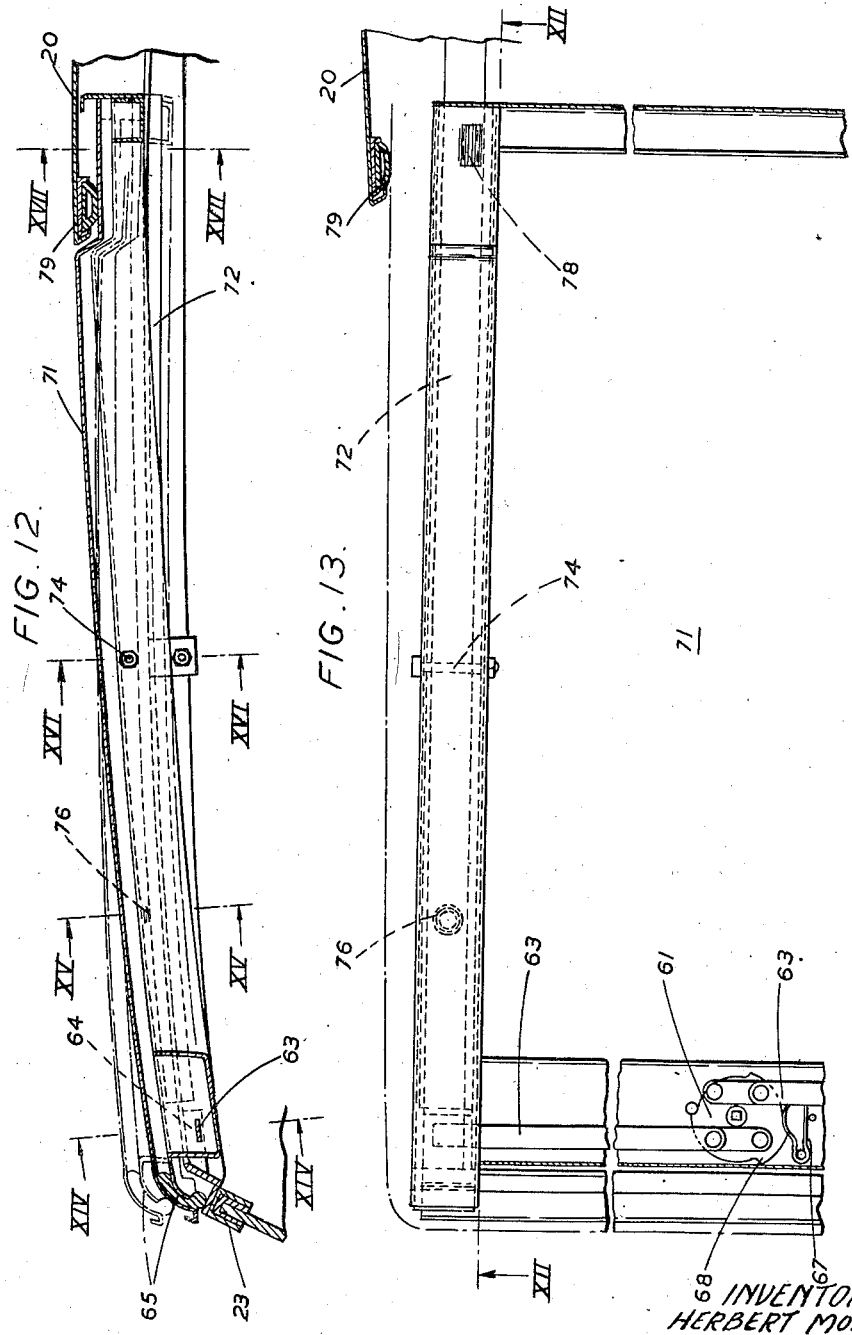
INVENTORS
HERBERT MOBBS
AND GEORGE HENRY SMITH
By
Emery Holcombe & Blair
Attorneys Jan. 20, 1948.   H. MOBBS ET AL   2,434,711
SLIDING ROOF FOR VEHICLES
Filed June 18, 1945   6 Sheets-Sheet 6

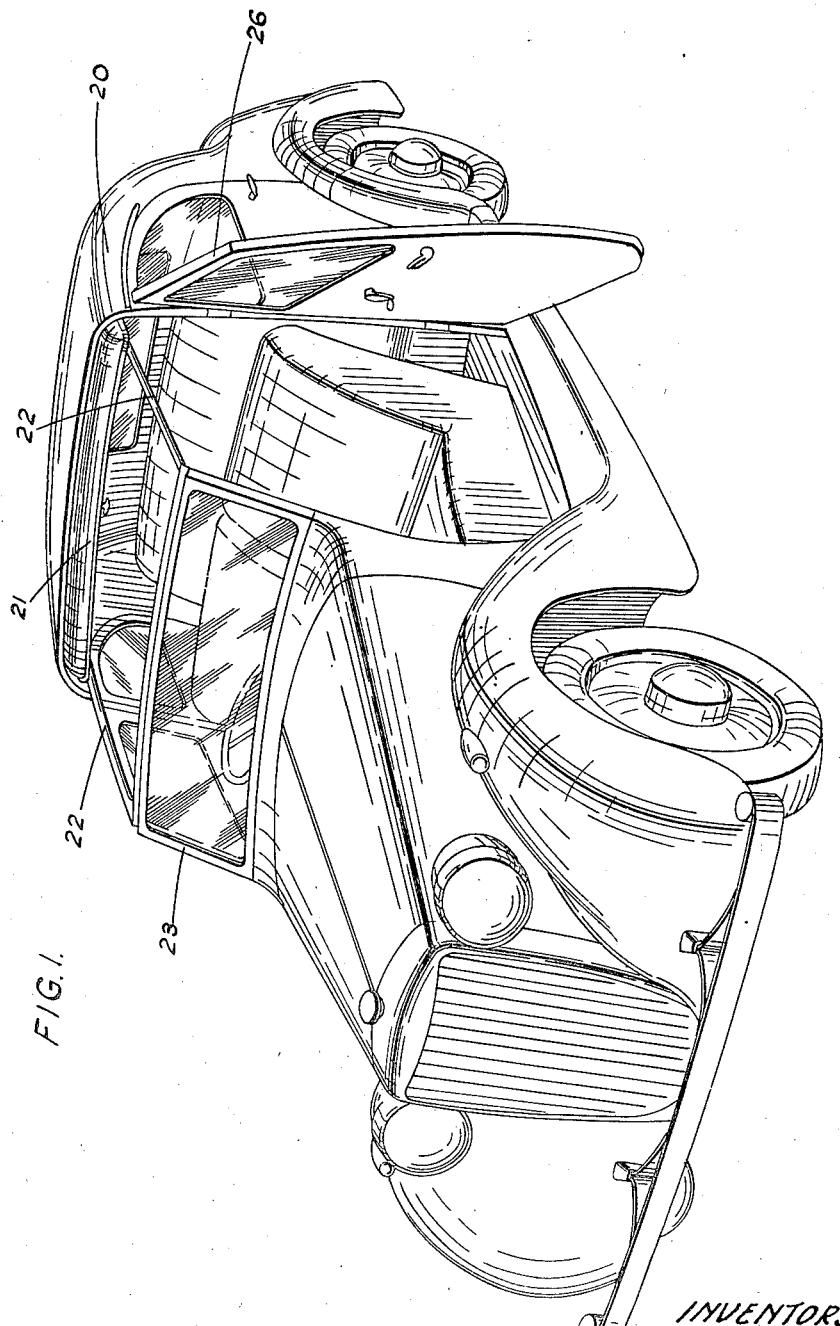

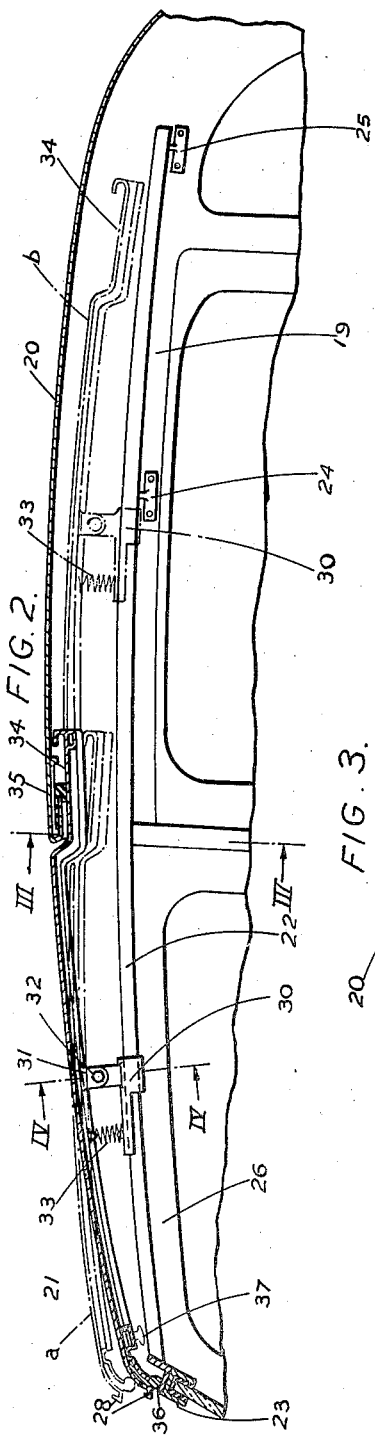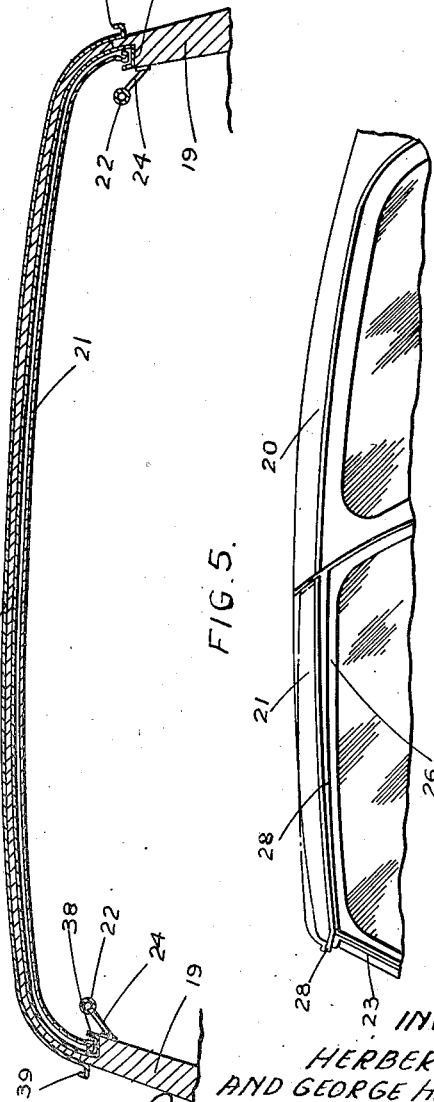

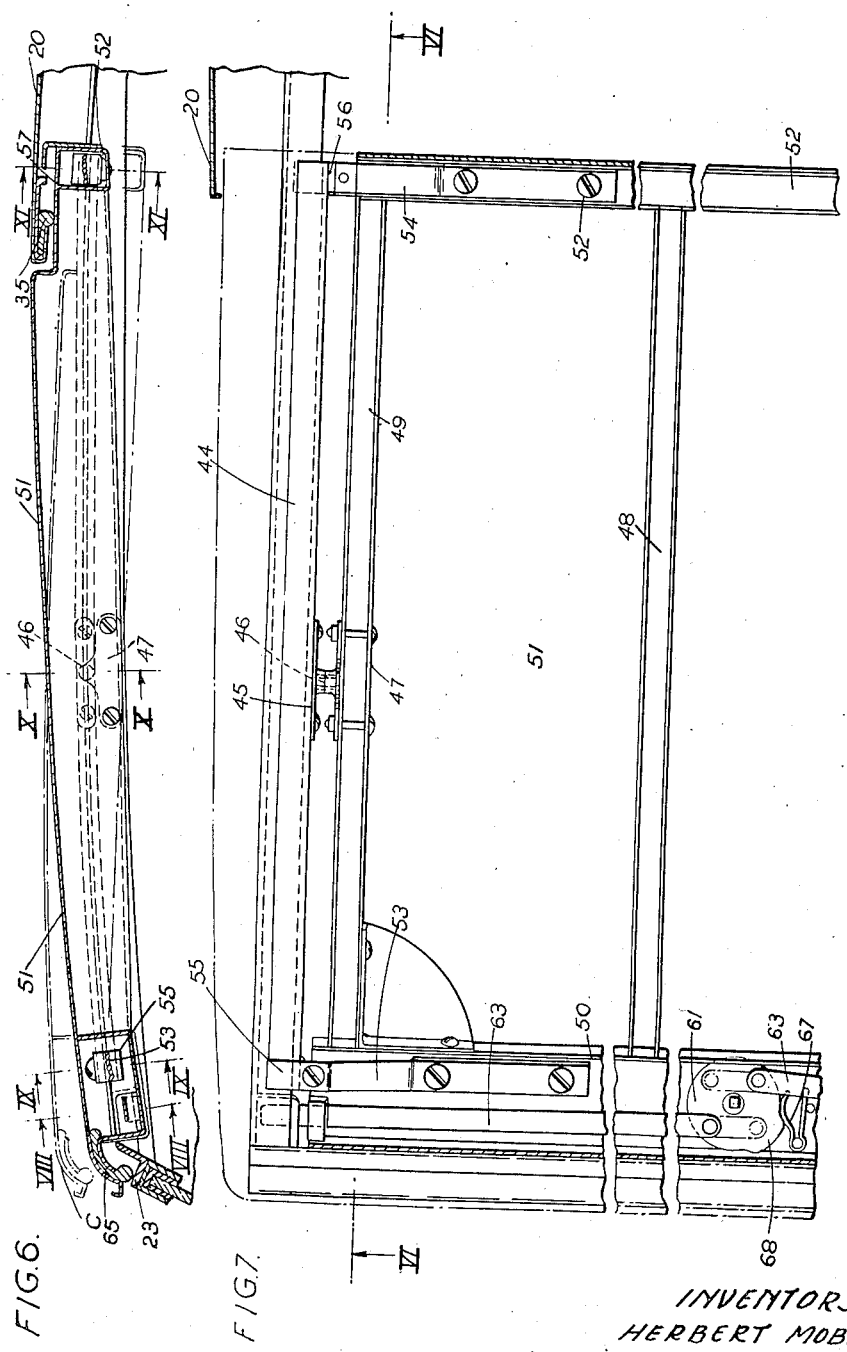

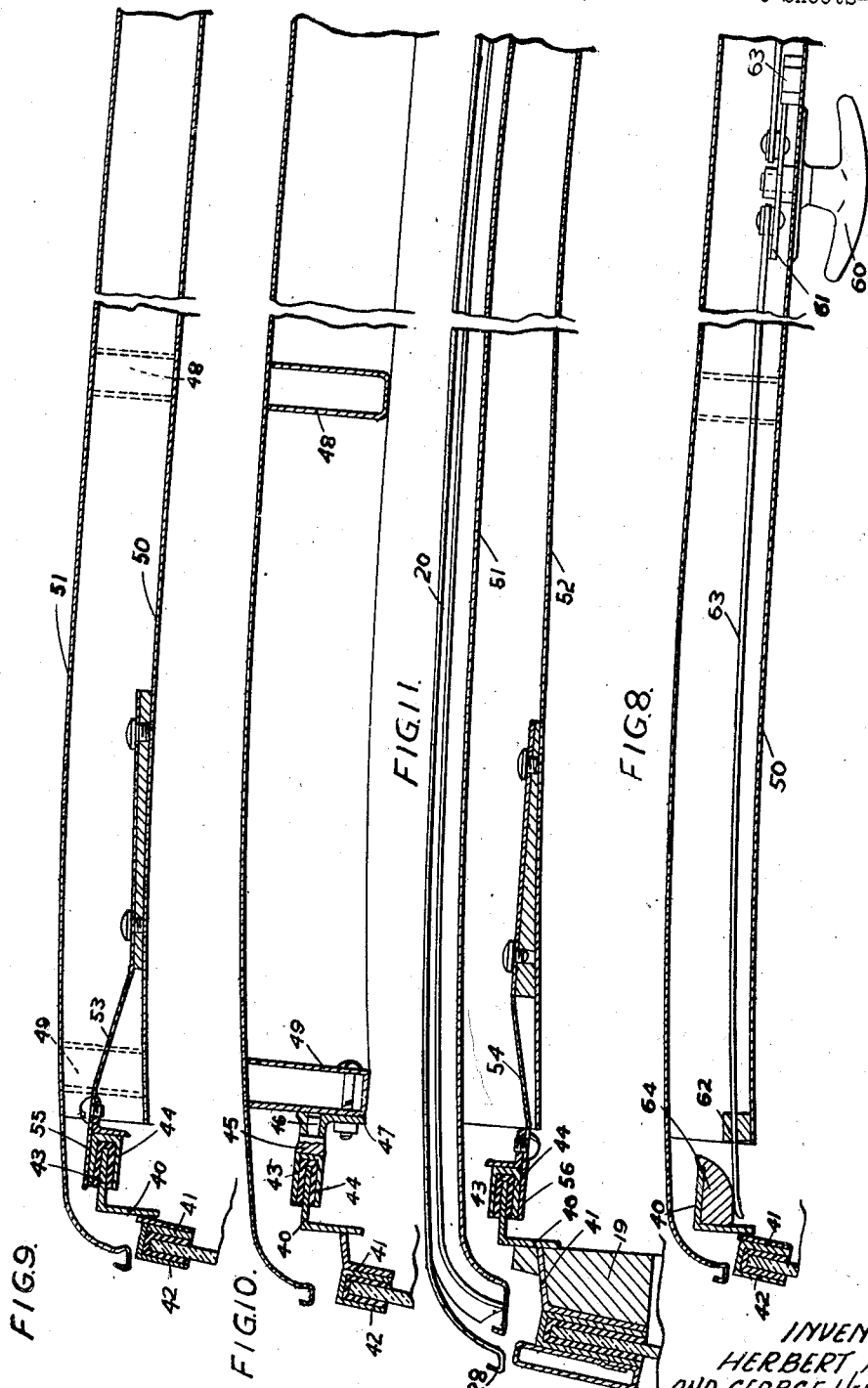

INVENTORS
HERBERT MOBBS
AND GEORGE HENRY SMITH
By
Emery Holcombe & Blair
Attorneys

Patented Jan. 20, 1948

2,434,711

UNITED STATES PATENT OFFICE 2,434,711

SLIDING ROOF FOR VEHICLES

Herbert Mobbs, Church Brampton, near Northampton, and George Henry Smith, Slough, England Application June 18, 1945, Serial No. 600,076
In Great Britain June 5, 1944

6 Claims. (Cl. 296—137)

This invention relates to roofs for automobiles having a fixed portion at the rear and a slidable portion at the front which can be drawn forward to close the roof, or pushed back to provide an open space in the front of said roof for ventilation and for outlook. It is the principal object of this invention to provide a form of roof for an automobile which when open will provide a clear space for outlook upwardly and forwardly as free as possible from obstruction, while the sliding portion or panel shall be easy to operate from within the vehicle. A further object is to provide such a roof in which the sliding panel may be supported so as to be capable of rocking about a transverse axis near the middle thereof under spring action, being locked in a forward position by manually operated locking means in such a position that it forms a continuation of the fixed portion of the roof forwardly up to the windscreen, while when unlocked the rocking of said panel under spring action may bring it into a position such that it is free to pass under the fixed portion of said roof when pushed rearwardly. Further objects are to provide for the effective lateral guidance of such a sliding panel when unlocked at the front, and to provide airtight and weathertight joints between said panel and said windscreen on the one hand, and between said panel and fixed roof on the other hand when in the locked position. These and other objects are attained by the roof structure hereinafter described and defined by the claims.

Throughout this description and claims the sliding portion of the roof is referred to as a panel to distinguish it from the fixed portion, but the word "panel" is used to include a sliding portion which forms a true continuation of the fixed portion forwardly when in a closed position, extending over the top and side parts of the automobile body so that when said panel is pushed back it may provide as clear a view as possible through the front upper part of said automobile.

The invention is illustrated by way of example in the accompanying drawings in which—

Figure 1 is a perspective view of an automobile to which the invention has been applied, showing the sliding panel in its fully retracted position;

Figure 2 is a longitudinal section of the roof of such an automobile showing in full lines the sliding panel in a closed position, and in dotted lines at $a$ the position which the sliding panel takes when released, and in dotted lines at $b$ the sliding panel in a fully retracted position;

Figure 3 is a cross section taken on the line III—III of Figure 2;

Figure 4 is a partial cross section taken on the line IV—IV of Figure 2;

Figure 5 is a side elevation drawn to a smaller scale showing the sliding panel in its forward closed position;

Figure 6 is a longitudinal section through part of a roof showing a modified form of sliding panel and guides therefor in the closed position, and in dotted lines $c$ in the released position, the section being taken on the line VI—VI of Figure 7;

Figure 7 is a partial underneath plan view of the roof of Figure 6;

Figure 8 is a partial transverse section taken on the line VIII—VIII of Figure 6;

Figures 9, 10 and 11 are partial transverse sections taken on the lines IX—IX, X—X and XI—XI respectively of Figure 6;

Figure 12 is a partial longitudinal section of a roof showing another modification, taken on the line XII—XII of Figure 13;

Figure 13 is a partial underneath plan view of Figure 12;

Figure 14:
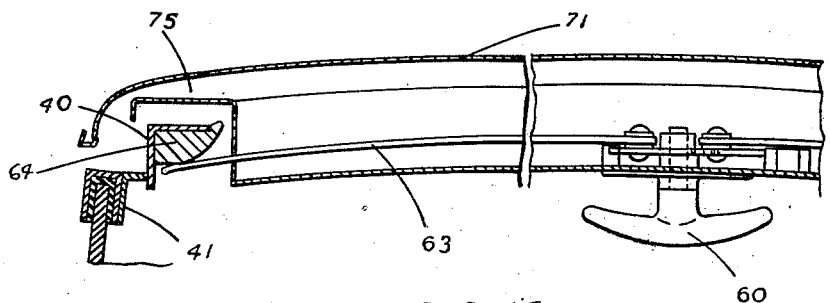
Figures 14 to 17 are partial cross sections taken on the lines XIV—XIV, XV—XV, XVI—XVI and XVII—XVII respectively of Figure 12.

Referring first to Figures 1 to 5, the automobile there shown has a fixed roof 20 over the rear of the body and a sliding panel 21 adapted to close the front part thereof. This panel 21 is guided in its movements by tubular guides 22 which extend from the frame 23 of the windscreen back to attachments such as brackets 24 and 25 on the sides 19 of the automobile body beneath the fixed roof 20, as best seen in Figures 2 and 3. The guides 22 are curved approximately to the fore-and-aft curvature of the roof as a whole but come nearer to the top at the front as seen in Figure 2, and are lower beneath the fixed roof 20 so as to guide the panel when retracted beneath the fixed roof. The guides 22 provide a tie between the fixed roof 20 and the windscreen which strengthens the roof structure of the automobile, but leaves a substantially unobstructed air space and view space forwardly and upwardly when the sliding panel is retracted as in Figure 1. The panel 21 forms a continuation of the fixed roof 20 when in its forward position as seen in Figure 5, not only of the top but of the sides down to the level of the tops of the doors 26, which may be channelled as at 27, Figure 4, to carry away any moisture which may pass under the gutters 28 at the sides of the sliding panel 21.

Slides 30 are arranged to work and to slide back and forth along the guides 22 and are connected by pivots 32 with lugs 31 fixed underneath the panel 21 near each side thereof and about mid-way between its front and rear ends so that the panel 21 can rock about the transverse axis formed by the pivots 32. Springs 33 disposed between forward extensions of the slides 30 and the sliding panel tend to lift the panel in front of the pivots 32 while depressing it at the rear, causing the panel to occupy the position shown in dotted lines at a, Figure 2, when in its forward position but free to rise at the front. The rear end of the panel has a depressed extension 34 which normally lies beneath the fixed roof 20, and terminates in a lip to catch any moisture which enters at the joint between the fixed roof 20 and the panel 21, so as to convey such moisture to the sides of the panel where it is discharged. The fixed roof has a sealing strip of rubber or the like 35 beneath it near the front serving to form an air and water seal between the fixed roof and panel when the latter is in the closed position as shown in full lines in Figure 2. The top of the body 19 may be made with a gutter or channel 38, as seen in Figure 3, to accommodate the sides of the panel 21 and to conduct away moisture. The fixed roof 20 has lateral gutters 39 as usual. The gutter 28 of the panel 21 extends all around the front thereof, and beneath the panel at the front is a sealing strip 36 of rubber or the like which makes an airtight and watertight joint between the front of the panel 21 and the frame 23 of the windscreen, when the front of the panel is pulled down as in Figure 2. Any suitable form of lock may be provided for securing the panel in its closed position or in any other position of adjustment if required. In the example shown, a handle 37 beneath the panel serves to operate a lock which may be of the type hereinafter described with reference to Figures 6 and 7 for example.

When the panel 21 is pulled forward and its front end is drawn down by the handle 37, which is turned as hereinafter described to operate the locking device, the panel is rocked about the axis 32 so that its forward end closes upon the top of the frame of the windscreen 23, while its rear end rises to contact with the sealing strip 35, and the panel then forms a substantial continuation of the curvature of the fixed roof 20 toward the front, both at the top and the sides. When the handle 37 is turned to release the lock, the front of the panel 21 rises to the dotted line position indicated at a, Figure 2, while its rear end falls under the action of the springs 33, and the panel can then be pushed back to any desired extent beneath the fixed roof 20 until it reaches its fully retracted position indicated in dotted lines at b, Figure 2. Even when fully forward as at a, Figure 2, the panel provides for substantial ventilation between itself and the windscreen, and the release of the lock may be used for this purpose. The rocking movement of the panel is checked by its depressed rear part 34 coming down upon the guides 22, but any other form of stop may be provided to limit the turning movement and to hold the panel in a position in which it will pass freely under the fixed roof 20 when retracted.

Referring now to Figures 6 to 11, the construction there shown has a fixed roof 20 and windscreen frame 23 as before, but instead of tubular guides 22 there are now provided side rails 40 of angular form with extensions 41 which, in the rear part, are secured to the tops of the sides of the body 19, and in the front part form a frame against which the tops of the front doors 42 will close. The angular side rails 40 extend forwards and are secured at their ends to the frame 23 of the windscreen. A sliding runner 44 fits, by means of resilient packing 43 of felt or the like, which eliminates noise and reduces friction, on each rail 40 and can travel thereon in a fore-and-aft direction. Each runner carries a bracket 45 with a socket which accommodates a pivot 46. The sliding panel 51 has strengthening channels 48 in the middle and 49 near each side extending longitudinally and connected to transverse members 50 and 52 at the front and back. The side channels 49 carry brackets 47 which accommodate the pivot pins 46 and enable the panel as a whole to rock about a transverse axis provided by the pivot pins 46 at each side. In order to steady the panel 51 laterally in intermediate positions of adjustment, metal tongues or leaf springs 53 near the front and 54 near the rear are provided at each side, secured at one end of each to the transverse members 50 and 52 respectively, and carrying at their outer ends angle brackets 55 and 56 respectively which engage with the runners 44 while allowing of the rocking movements of the panel 51. The springs 53 and 54 exert a tension in the direction tending to turn the panel 51 so that its front rises and its rear end falls, until the panel occupies the position shown in dotted lines at c in Figure 6. These springs 53 and 54 therefore serve with their end brackets 55 and 56 to act as lateral steadies or guides while the springs serve the purpose for which the springs 33 are used in Figures 1 to 5. The rear end of the panel is depressed as at 57 to pass under the fixed roof and to be lifted to engage with the rubber pad or seal at 35, as in the first described construction, when the panel is in its closed position as shown in full lines in Figure 6.

For locking the roof and pushing it back and forth a handle 60 is provided having its stem fixed in a disc 61 mounted to turn in the transverse member 50 and linked to rods 63 which slide in guides 62 near their outer ends. The ends of these rods are shaped to engage under bevelled or rounded blocks 64 affixed beneath the angular rails 40 near the front, as shown in Figure 8, when the handle 60 is turned to cause the rods 63 to move outwardly. This serves to lock the panel with its forward end drawn down in the closed position over the frame 23 of the windscreen as shown in full lines in Figure 6, where a rubber sealing strip 65 is also shown. When the panel is to be released the handle 60 is turned to draw back the rods 63, unlocking the front end and allowing the panel to rock until it occupies position c, Figure 6, under the action of springs 53 and 54. The panel is then free to pass under the fixed roof 20 and can be pushed back to any required extent. A spring 67, Figure 7, acts as a brake to restrict the free movement of disc 61, said spring 67 engaging in front or at the rear of a projection 68 on the disc 61 when the rods 63 are extended or retracted respectively.

Figure 15:
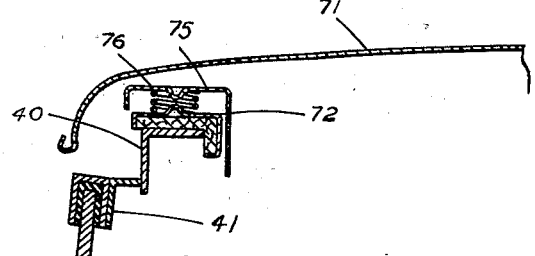
Figure 16:
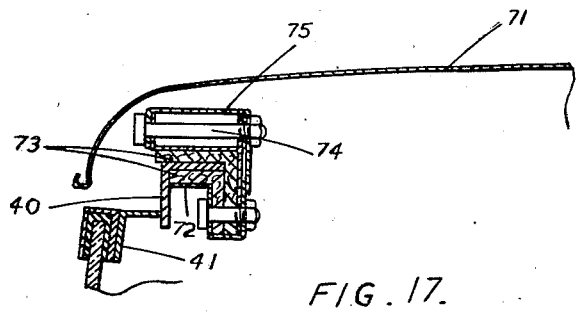
Figure 17:
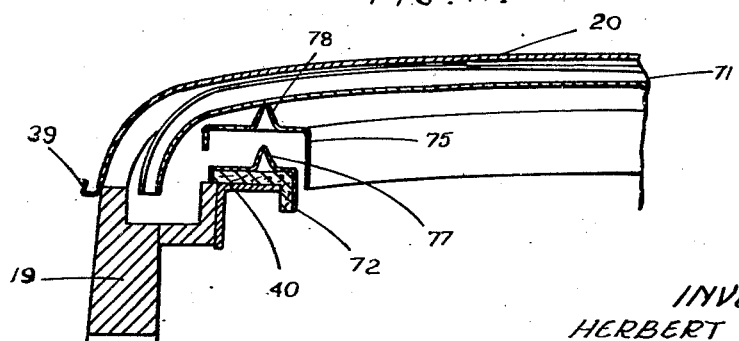

Referring now to Figures 12 to 17 inclusive, the panel 71 there shown is similar in form to the panels already described and can be pushed back under the fixed roof 20 or locked when engaging over the frame of the windscreen 23 as before. In this case also angular guides 40 are used as in Figures 6 to 11 and runners 72 with felt pads 73 work over the angular guides. The runners have lugs extending upwardly near their mid-points to support bolts 74 which form pivotal supports for the frame members 75 forming part of the structure of the panel 71. The front end of the panel is pressed up by springs 76 between the runners 72 and the frame members 75, located by projections punched in the members 72 and 75 as shown in Figure 15. The locking device shown in Figures 12 to 14 corresponds with that shown in Figures 7 and 8 and is numbered accordingly.

In order to provide against lateral movements of the panel 71 when unlocked, the runners 72 are provided with angular projections 77 near the rear end which engage between tongues 78 punched out of the metal of the frame members 75 when the panel is rocked about its pivots by the spring 76. Hollow rubber pads 79, Figure 12, provide a resilient weathertight seal between the rear of the panel and the fixed roof 20 when the front is locked by the locking device shown in Figure 13, which is similar to that shown in Figures 7 and 8.

The invention is not limited to the particular examples hereinbefore described and the details of construction may obviously be modified in many respects without departing from the scope of the invention. Where sliding surfaces are provided any usual means such as rollers for reducing friction may of course be added and the guide bars may take any convenient form. The form of the panel may vary according to the type of automobile to which it is applied and the shape of its roof structure.

We claim:

1. In an automobile, a roof structure comprising a fixed roof extending over the rear part thereof and a sliding panel adapted to constitute a forward extension of said fixed roof, guides extending forwardly from the fixed roof near each side and slides movable longitudinally on said guides, means of support between said sliding panel and said slides arranged to permit rocking movements of said panel about a transverse axis near to the middle of said panel, and means urging said panel to turn in one direction about said supporting means.

2. In an automobile having a windscreen, a roof structure comprising a fixed roof extending over the rear part of said body and a sliding panel adapted to form a continuation of said fixed roof between it and said windscreen, two guide members one at each side extending under said fixed roof forwardly to points of attachment on said windscreen, slides movable longitudinally on said guide members, means of support between said sliding panel and said slides arranged to permit rocking movements of said panel about a transverse axis near to the middle of said panel, spring means tending to raise the front and to depress the rear of said panel, and means adapted to hold down the front end of said panel in engagement with said windscreen in the closed position of said panel.

3. In an automobile having a windscreen, a roof structure comprising a fixed roof extending over the rear part of said body and a sliding panel adapted to form a continuation of said fixed roof between it and said windscreen, two guide members one at each side extending under said fixed roof forwardly to points of attachment on said windscreen, slides movable longitudinally on said guide members, means of support between said sliding panel and said slides arranged to permit rocking movements of said panel about a transverse axis near to the middle of said panel, leaf springs attached to said panel beneath and at each side thereof near the front and rear respectively, and brackets on said leaf springs arranged to engage with said slides, said leaf springs being arranged to co-operate in a direction tending to raise the front of said panel and to depress the rear thereof.

4. In an automobile having a windscreen, a roof structure comprising a fixed roof extending over the rear part of said body and a sliding panel adapted to form a continuation of said fixed roof between it and said windscreen, two guide members one at each side extending under said fixed roof forwardly to points of attachment on said windscreen, slides movable longitudinally on said guide members, means of support between said sliding panel and said slides arranged to permit rocking movements of said panel about a transverse axis near to the middle of said panel, spring means tending to raise the front and to depress the rear of said panel, a handle and means supporting it revolubly beneath said panel near the front thereof, locking bars and means for extending them under the control of said handle, and wedge members attached to said guide members in a position to be engaged by said locking bars when extended, whereby said panel is adapted to be held against the pressure of said spring with its front end depressed in a forward position.

5. In an automobile having a windscreen, a roof structure comprising a fixed roof extending over the rear part of said body and a sliding panel adapted to form a continuation of said fixed roof between it and said windscreen, two guide members one at each side extending under said fixed roof forwardly to points of attachment on said windscreen, slides movable longitudinally on said guide members, means of support between said sliding panel and said slides arranged to permit rocking movements of said panel about a transverse axis near to the middle of said panel, spring means acting in a direction tending to raise the front and to depress the rear of said panel, and means for holding said panel with its front end depressed against the action of said spring means when in its forward position, and sealing means arranged to provide weathertight joints between the front of said panel and said windscreen on the one hand, and between the rear of said panel and the fixed roof on the other hand when so held.

6. In a roof for an automobile including a fixed section covering a part of the body, a movable section slidable from an extended position overlying another section of the body past an edge of the fixed section to a retracted position masked by the fixed section, guides extended parallel to the path of travel of the movable section and extending in spaced relation to a surface of the fixed section, and a slide movable along each guide; means pivotally supporting the movable section substantially midway of its length on the slide for tilting about an axis substantially parallel to the edge of the fixed section past which it moves and between the margins of the movable section, said means including resilient elements interposed between the end portions of said movable section and the guides and arranged to permit tilting while resisting lateral displacement of the movable section said movable section being arranged to move past said edge of and to clear said fixed section, and said edge of the fixed section and an edge of the movable section being arranged to be brought into and out of engagement by tilting of the movable section in its extended position.

HERBERT MOBBS.
GEORGE HENRY SMITH.

REFERENCES CITED

The following references are of record in the file of this patent:

UNITED STATES PATENTS

| Number | Name | Date |
|---|---|---|
| 2,041,281 | Bishop | May 19, 1936 |
| 2,108,456 | Thompson et al. | Feb. 15, 1938 |
| 2,245,832 | Simpson | June 17, 1941 |

FOREIGN PATENTS

| Number | Country | Date |
|---|---|---|
| 503,407 | Great Britain | Apr. 3, 1939 |